United States Patent [19]
Phillips

[11] 4,127,009
[45] Nov. 28, 1978

[54] ABSORPTION HEAT PUMP ABSORBER UNIT AND ABSORPTION METHOD

[75] Inventor: Benjamin A. Phillips, Benton Harbor, Mich.

[73] Assignee: Allied Chemical Corporation, Morris Township, Morris County, N.J.

[21] Appl. No.: 796,084

[22] Filed: May 12, 1977

[51] Int. Cl.² .................. F25B 15/00; F25B 37/00
[52] U.S. Cl. .......................... 62/101; 62/476; 62/485; 62/494
[58] Field of Search ............ 261/140 A; 62/101, 476, 62/494, 485

[56] References Cited

U.S. PATENT DOCUMENTS

| | | | |
|---|---|---|---|
| 423,133 | 3/1890 | Cooke | 62/476 |
| 1,976,593 | 10/1934 | Altenkirch | 62/494 |
| 2,392,894 | 1/1946 | Zwickl | 62/476 |
| 2,650,480 | 9/1953 | Gilmore | 62/101 |
| 3,166,914 | 1/1965 | Hallatt | 62/101 |
| 3,389,573 | 6/1968 | Papapanu et al. | 62/101 |
| 3,394,926 | 7/1968 | Whitlow et al. | 62/494 |
| 3,396,549 | 8/1968 | McGrath | 62/101 |
| 3,509,732 | 5/1970 | Roeder, Jr. | 62/494 |
| 3,626,716 | 12/1971 | Leonard, Jr. et al. | 62/324 |
| 3,638,452 | 2/1972 | Kruggel | 62/485 |

Primary Examiner—Lloyd L. King
Attorney, Agent, or Firm—Alan M. Doernberg; Jay P. Friedenson

[57] ABSTRACT

An absorber unit for an absorption heat pump including a housing defining an interior absorption space and having first and second ends, a first inlet adjacent to the first end, a second inlet and an outlet adjacent to the second end, a plurality of heat exchange elements forming a plurality of pathway portions in heat exchange relation with the interior absorption space and within the absorber housing, with some of the plurality of pathway portions being joinable into a first pathway for conducting a coolant and the remainder of the plurality of pathway portions being joinable into a second pathway for conducting rich liquor; the second pathway communicating with the outlet and the central absorption space being divided by the pathway portions into a plurality of absorption zones having a large surface area for efficient absorption and heat exchange.

29 Claims, 11 Drawing Figures

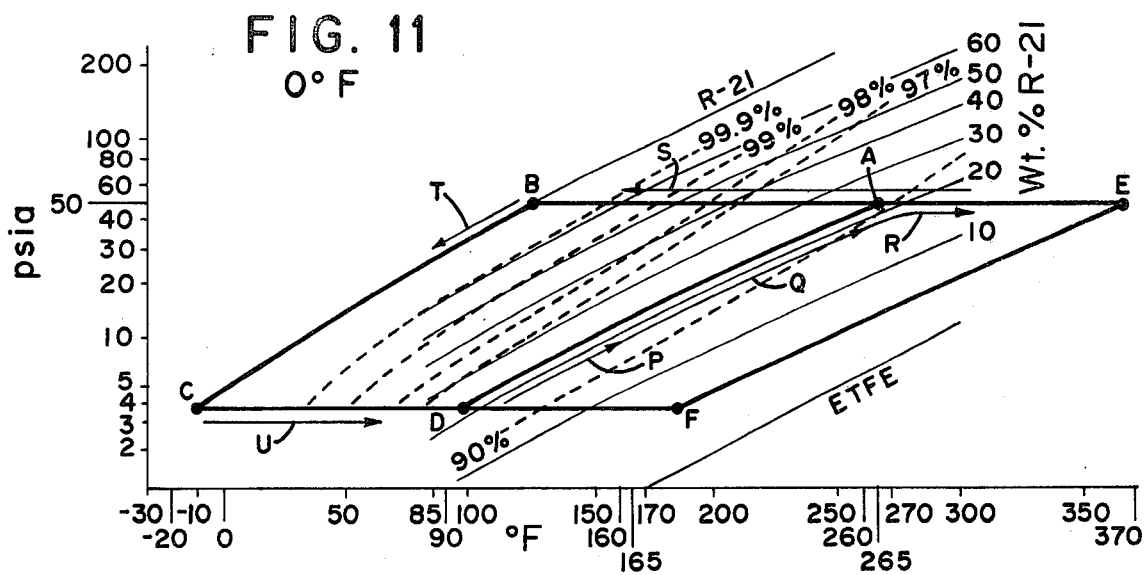
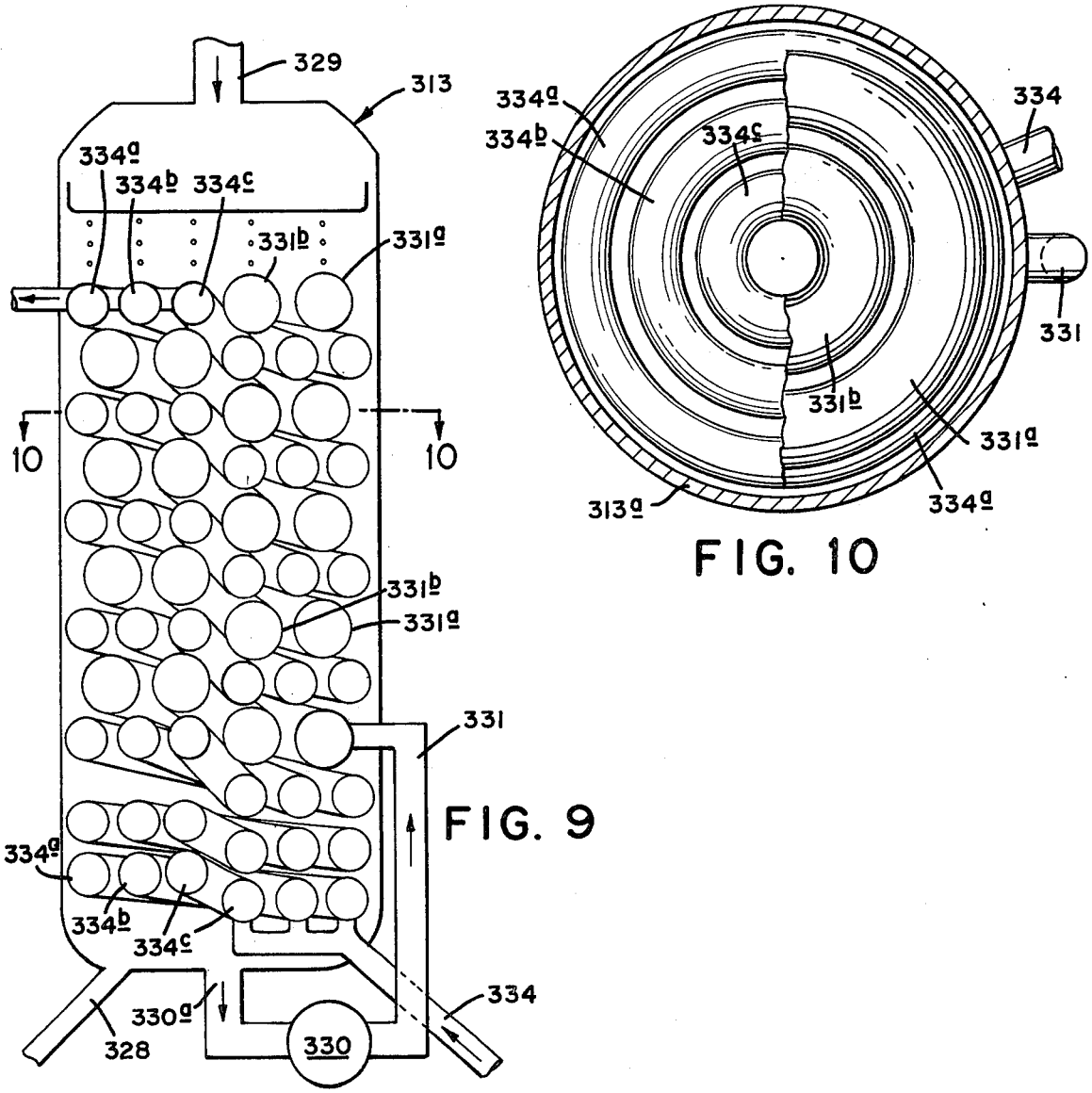

ABSORPTION HEAT PUMP ABSORBER UNIT AND ABSORPTION METHOD

BACKGROUND OF THE INVENTION

Absorption heat pump and refrigeration systems are known for the mixing of solution depleted of refrigerant (weak liquor from the generator) with evaporated refrigerant (from the condenser frequently through a precooler). Exemplary systems are disclosed in U.S. Pat. Nos. 2,059,841 (Nov. 3, 1936 to Backstrom), 2,193,535 (Mar. 12, 1940 to Maiuri), 2,392,894 (Jan. 15, 1946 to Zwickl), 3,527,060 (Sept. 8, 1970 to Kruggel), 3,626,716 (Dec. 14, 1971 to Leonard, Jr.) and 3,638,452 (Feb. 1, 1972 to Kruggel). An older form of absorber is described on page 3 of U.S. Pat. No. 423,133 (Mar. 11, 1890 to Cooke). U.S. Pat. No. 3,638,452 discloses a coolant circuit through, sequentially, a low temperature portion of the absorber, the condenser and a high temperature portion of the absorber. U.S. Pat. No. 3,626,716 discloses an absorber with a liquid heat exchange medium circulated through an interior tube and an absorbent-refrigerant mixture circulated between the interior tube and an outer tube. U.S. Pat. No. 2,392,894 discloses an absorber with rich liquor (called strong aqua) pumped from the bottom of the absorber back through the upper portion of the absorber and cooling water circulated through the lower portion of the absorber.

The systems disclosed in the prior art, and particularly in U.S. Pat. No. 3,638,452, have the disadvantage that the evaporated refrigerant is introduced at or near the same end of the "absorber" as the weak liquor (or if one considers the "absorber heat exchanger" unit in U.S. Pat. No. 3,638,452 as a part of the absorber, then the refrigerant is introduced at an intermediate point). With such a design, at the point of refrigerant entry, the mixing of "dry" refrigerant (relatively free of absorbent vapor) with absorbent lowers the peak absorption temperature significantly. This lowering of the peak absorption temperature lowers the potential for using the absorption zone to heat coolant (for expulsion from the system in the cooling mode or for the heating load in the heating mode) or to preheat rich liquor.

The absorber units of the prior art also provide insufficient heat exchange and mass transfer surfaces to allow the vapor to reach a composition that approaches equibrium with the adjacent liquid. The advantages of the present invention are realized with absorption pairs such as R21-ETFE (discussed below); however, the advantages of the present invention can be realized as well with conventional absorption pairs such as ammonia-water or the many other absorption pairs known (see W. R. Hainsworth, "Refrigerants and Absorbents," Refrigerating Engineer Vol. 28, Nos. 3 and 4, August and September 1944 and U.S. Pat. No. 4,005,584, Feb. 1, 1977 to Li) and to be discovered.

BRIEF DESCRIPTION OF THE INVENTION

The invention includes an absorber unit for an absorption heat pump system comprising a housing defining an interior absorption space and having first and second ends, a first inlet adjacent to first end, a second inlet and an outlet adjacent to the second end, a plurality of heat exchange elements forming a plurality of pathway portions in heat exchange relation with the interior absorption space and within the absorber housing for withdrawing heat from the interior absorption space into the pathway portions; with some of the plurality of pathway portions being joinable into a first pathway for conducting a coolant and the remainder of the plurality of pathway portions being joinable into a second pathway for conducting rich liquor; the second pathway communicating with the outlet and the plurality of pathway portions dividing the interior absorption space into a plurality of absorption zones, with each pathway portion being sealed off from and in heat exchange relation with an adjacent absorption zone for thorough mass transfer and and absorption in said absorption zones and a high level of heat exchange into said pathway portions.

It will be appreciated that, although applicable to absorption heat pump systems generally, and particularly those capable of operating in the heating mode, the present system is especially preferred as a part of a heat pump system as described in my copending, commonly assigned application, Ser. No. 796,773, filed May 13, 1977.

BRIEF DESCRIPTION OF THE DRAWING

FIG. 9 is a front elevational view of an absorber unit according to a fourth embodiment of the present invention;

FIG. 10 is a top plan view taken along line 10—10 in FIG. 9;

FIG. 11 is a pressure-temperature graph illustrating the operation of the present invention in the heating mode at 0° F. ambient temperature.

DETAILED DESCRIPTION OF THE INVENTION

Figure 1:
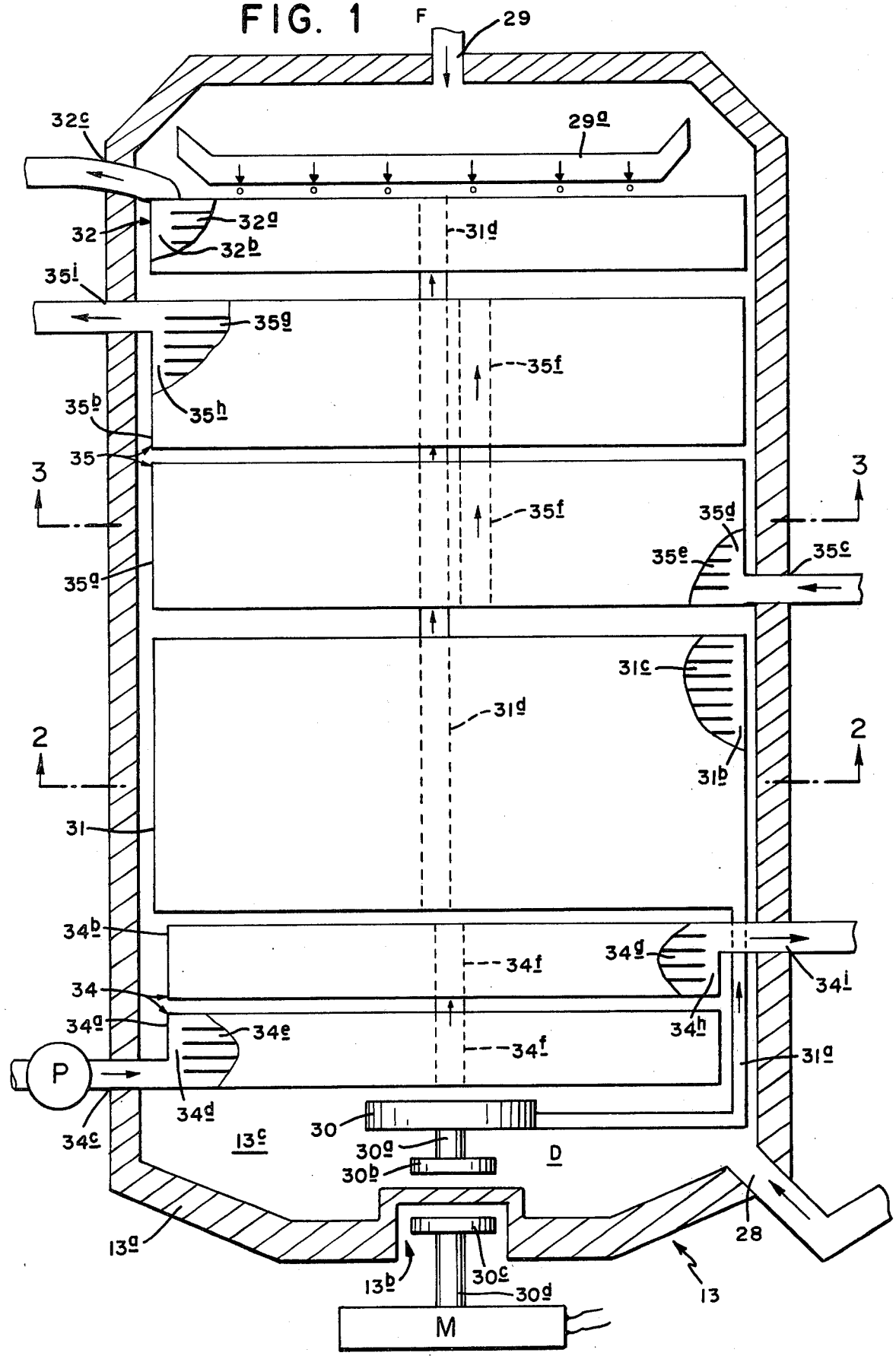
FIG. 1 is a front elevational view in partial section of an absorber unit according to a first embodiment of the present invention.
Figure 2:
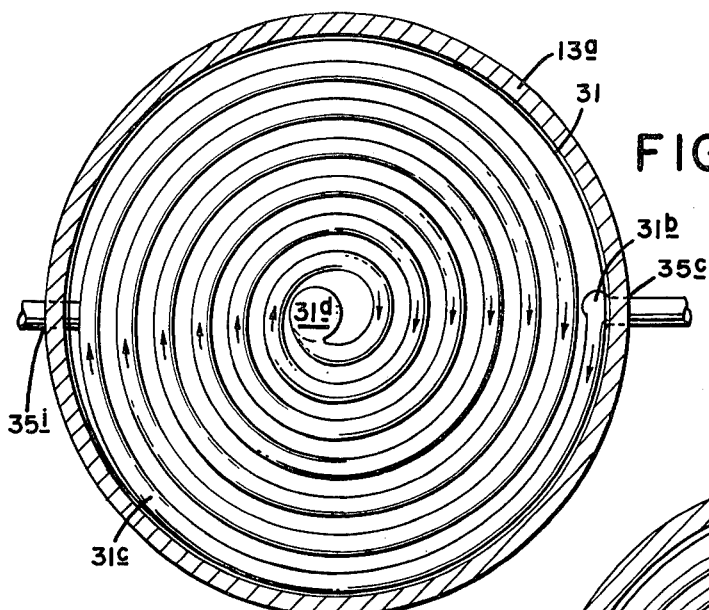
FIG. 2 is a bottom plan view along line 2—2 in FIG. 1.

As used herein "rich liquor" (sometimes referred to in the art as weak absorbent solution) refers to the solution of absorbent higher in refrigerant concentration. As used herein "weak liquor" (sometimes referred to in the art as strong absorbent solution) refers to the solution of absorbent lower (or without) refrigerant concentration. The "absorber" unit is that part of an absorption system wherein refrigerant is absorbed into weak liquor to form rich liquor.

The present absorber unit is particularly designed for incorporation into an absorption heat pump system capable of operation in a heating or cooling mode; however it may also be incorporated into any "absorption heat pump system" capable of operation in one mode only, including an absorption air conditioning system, absorption heating unit or an absorption refrigeration system. The absorption unit would be connected into the system by the first inlet connected to a source of "weak liquor" from the generator and by the second inlet connected to a source of evaporated refrigerant from the evaporator (directly or indirectly through a precooler).

The following is an explanation of "joinable" as used herein. The first pathway, consisting primarily of heat exchange elements, would in operation be connected so as to extend from the "outlet" of the absorber to a first pathway outlet connected to the "rich liquor inlet" of the generator. Many of the connections in the first pathway may be formed upon assembly of the absorber. The second pathway, consisting in the absorber primarily of heat exchange elements, would be formed before operation by making various connections between the inlets and outlets of such heat exchange elements and the coolant inlet and outlet of the condenser and a "heat exchanger" of the heat pump system. For air conditioning or refrigeration systems, this "heat exchanger" would be located in heat exchange relation with ambient air or some other heat sink or well. For systems capable of operation in a heating mode this heat exchanger would be in heat exchange relation with the space or material to be heated. For systems capable of operation in either mode, a switch or valve would be provided to selectively interconnect into the second pathway different such "heat exchangers".

Thus the term "joinable" is used in describing the components of the absorber since they might not be joined into their respective pathways until the heat pump system is assembled. It should be understood that, although frequently designed for a particular set of interconnections into a heat pump system, some absorbers within the scope of the present invention are capable of being joined in a variety of ways into a heat pump system as by interconnecting one or more heat exchanger elements into the first rather than the second pathway. Specifically, a particular set of heat exchanger elements might permit the condenser to be connected into the second pathway in parallel with the absorber, or in series upstream of any part of the absorber, between heat exchanger elements of the absorber or downstream of all heat exchanger elements of the absorber.

As discussed below, the present absorbers may be used with or designed for any absorption pair of "absorbent" and "refrigerant" such as: ammonia (refrigerant) — water (absorbent); water (refrigerant) — LiCl or LiBr (absorbent); or fluorocarbon (refrigerant) — dimethyloxytetraethylene glycol (DMTEG) (absorbent). Preferred for many systems are the furan-derivative (absorbent) and fluorocarbon (refrigerant) absorption pairs disclosed in U.S. Pat. No. 4,005,584 and, especially, the stabilized compositions of pending, commonly assigned application Ser. No. 760,489 of M. B. Berenbaum et al., filed Jan. 19, 1977 now U.S. Pat. No. 4,072,027. In the discussion that follows, the absorption pair of dichloromonofluoromethane (R21) (refrigerant) and ethyl tetrahydrofurfuryl ether (ETFE) (absorbent) will be used as illustrative (and referred to as R21-ETFE).

Some preferred forms of the absorber unit described above are those further comprising a solution pump in the interior absorption space adjacent the second end having an inlet communicating with the interior mixing space and an outlet communicating with second pathway, the solution pump inlet being the outlet of the absorber unit.

Some preferred forms of the absorber unit are those further comprising a prime mover outside said housing, a drive magnet outside the housing adjacent the second end operatively connected to the prime mover to be rotated thereby, a driven magnet inside the absorber in proximity to the drive magnet and a driven shaft operatively connecting the driven magnet to the solution pump. It will be appreciated that the prime mover, drive shaft and drive magnet may be a separate unit or units brought into such proximity with the absorber unit that the drive magnet can magnetically drive the driven magnet through the absorber wall.

Some preferred forms of the absorber unit are those wherein the heat exchange elements comprise a plurality of coil units each having a plurality of spiral coils stacked in a parallel arrangement and manifolded on the outside and inside thereof, with each of the pathway portions being the branched interconnection between an outside manifold and an inside manifold.

Some more preferred forms of the absorber unit described in the preceding paragraph are those wherein the spiral coils each have flat side faces and rounded top and bottom faces, with adjacent spiral coils being stacked top to bottom, and each spiral coil having a plurality of turns each having a side face spaced from the facing side face of the adjacent turn.

Some preferred forms of the absorber unit are those wherein the plurality of heat exchange elements includes a first heat exchange element which is connected in the first pathway, a second heat exchange element which is connected in the second pathway and is located between the first heat exchange element and the second end. In operation the "first end" is the hot end of the absorber, the "second end" is the warm end of the absorber, the "first pathway" is a rich liquor pathway and the "second pathway" is a coolant pathway.

Some more preferred forms of the absorber unit described in the preceding paragraph are those wherein the second heat exchange element has an inlet through the absorber wall for connection to a coolant source and an outlet through the absorber wall for connection to the coolant inlet to the condenser of the heat pump system and the plurality of heat exchange elements further comprises a third heat exchange element located between the first heat exchange element and the first end, the third heat exchange element having an inlet through the absorber wall for connection to the coolant outlet of the condenser and an outlet through the absorber wall. It will be appreciated that this outlet would, in operation, normally be connected to a heat sink (the ambient air or "outside" heat exchanger) in the cooling mode, to a heat exchanger in heat exchange with the space or material to be heated in the heating mode and to an eight-way valve or the like in a system capable of operating in either mode.

Some more preferred embodiments of the absorber unit described in the preceding paragraph are those wherein the first heat exchange element has an inlet connected to the outlet of the absorber and an outlet through the absorber wall for connection to the rich liquor inlet of the generator of the heat pump system. The connection between the first heat exchange element and the "outlet" of the absorber unit may be totally within the absorber housing as shown in FIG. 1.

Some preferred forms of the absorber unit described in the preceding paragraph but one, including but not limited to some of those described in the preceding paragraph, are those wherein the plurality of heat exchange elements further comprises a fourth heat exchange element which is connected in the first pathway and is located between the third heat exchange element and the first end and has an outlet through the absorber wall for connection to the rich liquor inlet of the generator of the heat pump system and also has an inlet, and wherein the first heat exchange element has an outlet connected to the inlet of the fourth heat exchange element.

Some preferred forms of the absorber unit described in the Brief Description are those wherein the plurality of heat exchange elements includes a plurality of concentric cylindrical units extending parallel to a central axis of the absorber housing and extending from a first end adjacent the first end of the absorber housing to a second end adjacent the second end of the absorber housing, each cylindrical unit being radially spaced from the adjacent cylindrical unit. An example of such an absorber unit is one according to the third preferred embodiment illustrated in FIGS. 7 and 8.

Figure 7:
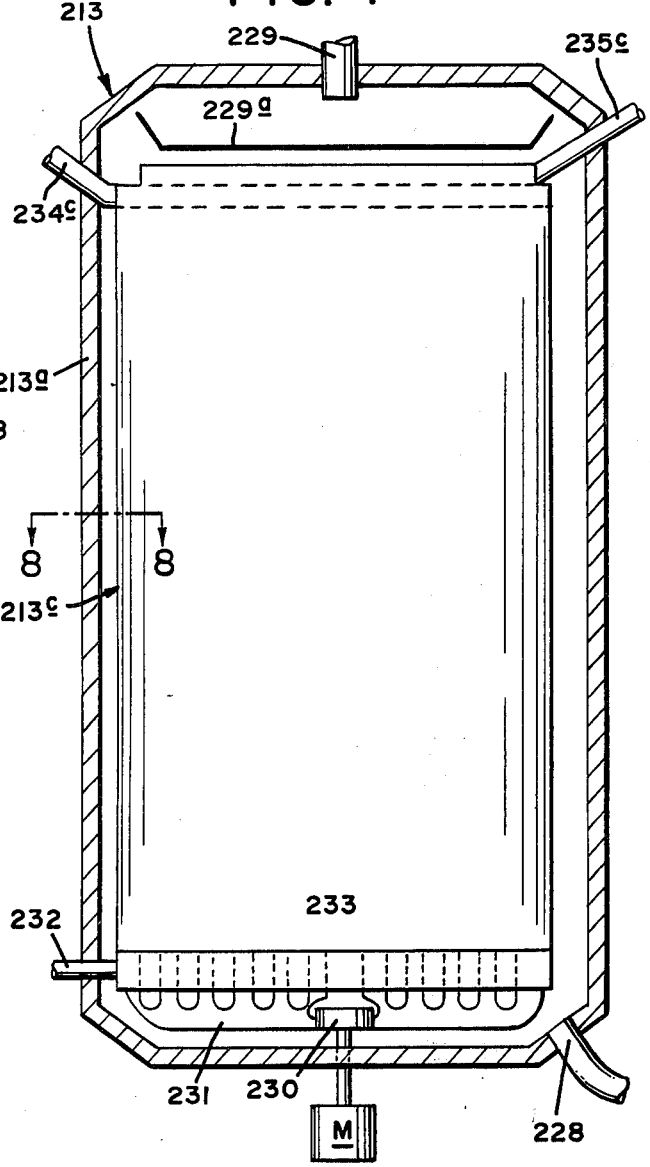
FIG. 7 is a front elevational view of an absorber unit according to a third embodiment of the present invention.
Figure 8:
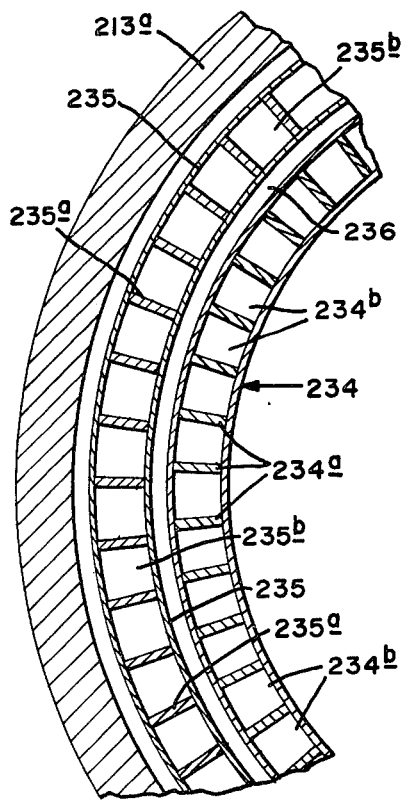
FIG. 8 is an enlarged top plan view in section of an outside portion of the absorber unit of FIG. 7.

Some more preferred forms of the absorber unit described in the preceding paragraph are those wherein each of the plurality of cylindrical units includes a concentric inner and outer wall and a plurality of circumferentially spaced baffles extending therebetween and from adjacent the first end of each ring to adjacent the second end of each cylindrical unit and dividing each cylindrical unit into a plurality of passages extending from adjacent the first end of each ring to adjacent the second end of each ring; a first plurality of the passages of the cylindrical unit being connected in the first pathway with portions adjacent their second ends being connected to the outlet of the absorber and with portions adjacent their first ends being connected to a first pathway outlet through the absorber wall for connection to the rich liquor inlet of the heat pump system. The embodiment illustrated in FIGS. 7 and 8 is among these more preferred forms.

Still more preferred forms of the absorber unit described in the preceding two paragraphs are those wherein a second plurality of the passages are connected in the second pathway with portions adjacent their second ends being connected to a second pathway inlet through the absorber wall and with portions adjacent their first ends being connected to a second pathway outlet through the absorber wall. The embodiment illustrated in FIGS. 7 and 8 is among these still more preferred forms.

Some preferred forms of the absorber unit described in the preceding paragraph but one, including but not limited to some of those described in the preceding paragraph, are those further comprising a solution pump with the housing having an inlet communicating with the interior absorbing space adjacent the second end of the housing and being the absorber outlet, the solution pump also having an outlet connected to the first plurality of passages adjacent their second ends.

DESCRIPTION OF THE PREFERRED EMBODIMENTS

An absorber unit for an absorption heat pump system according to a first embodiment of the present invention is illustrated in FIGS. 1–5. Referring first to FIG. 1, the absorber 13 includes a cylindrical absorber wall or housing 13a, somewhat tapered at the top or first end and at the bottom or second end. A recess 13b is formed in the exterior of the second or bottom end. The absorber wall 13a defines an interior, central absorption space 13c in which absorption may take place as described below.

A plurality of conduits or apertures communicate through the absorber wall 13a with the interior space 13c. A first conduit 29 adjacent to the top or first end serves as the weak liquor inlet. A second conduit 28 adjacent to the bottom or second end serves as the evaporated refrigerant inlet and may communicate directly with the precooler as shown in my application, Ser. No. 796,773, filed herewith. A spreader or distributor 29a is provided beneath the first conduit 29 and overlays the major portion of the interior space 13c.

A solution pump 30 is located within the interior space 13c adjacent the lower end and has at least one inlet communicating with the interior space for withdrawing abosrbed solution (rich liquor) therefrom. This inlet serves as the "rich liquor outlet" of the absorber 13 even though it is not outside the physical space defined by the absorber wall 13a. It is sufficient that the pump 30 and the pathway downstream therefrom be out of further communication with the interior or absorption space 13c, such that the rich liquor not be permitted to lose its relatively high content of refrigerant to the absorbing solution.

The solution pump 30 may be a rotary or other pump of conventional design with a peripheral or axial inlet, a peripheral outlet and a central rotary axis. The pump 30 is driven by an internal or driven shaft 30a extending downwardly from the pump 30 toward the recess 13b formed in the absorber wall 13a. A driven or internal magnet 30b is integral with the driven shaft 30a so as to rotate therewith, and is located immediately adjacent the recess 13b, but on the interior of the absorber wall 13a. Within the recess 13b and opposite the driven magnet 30b, is a drive or external magnet 30c on the end of a drive or external shaft 30d, so as to rotate therewith, extending upward from a motor or other prime mover means.

Within the interior space 13c, and above the solution pump 30, are a series of heat exchanger coil units or elements occupying a substantial portion of the interior space 13c. As described below, each coil unit has several interior compartments or tubes together defining a space or "pathway portion" for the flow of coolant or rich liquor. Between, and in heat exchange relation with these compartments are spaces or mixing zones in communication with and a part of the interior space 13c, where refrigerant may be absorbed into weak liquor. Weak liquor, having varying amounts of refrigerant absorbed therein, shall be called "absorbing liquid". Each coil unit is generally disc shaped with a central axis substantially collinear with the central axis of the generally cylindrical absorber wall 13a.

Figure 4:
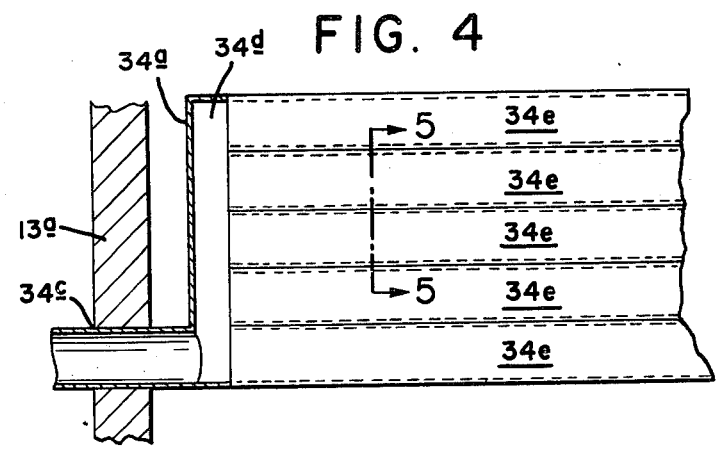
FIG. 4 is an enlarged front elevational view of the absorber unit of FIG. 1 fully in section.

The lowest of these coil units 34a communicates through the absorber wall 13a adjacent the bottom or second end with a coolant line or coolant inlet conduit 34c shown as having a pump just outside the absorber wall 13a. This coolant pump may be located many other places in the coolant pathway. The coil 34a has an exterior vertical inlet manifold 34d communicating with the coolant line 34c and a series of vertically stacked spiral tubes 34e spiralling inwardly, as shown in FIGS. 4. The spiral tubes 34e are manifolded at their interior ends by a vertical conduit or interior manifold 34f which extends upwardly into a second coil element 34b. A series of vertically stacked spiral tubes 34g extend outwardly from the interior manifold 34f to an exterior or outlet manifold 34h which communicates through the absorber wall 13a with a coolant line or coolant outlet conduit 34i. The coolant outlet conduit 34i would normally be insulated and connected with the coolant inlet of the condensor of the heat pump system.

Together, the first and second coil units 34a and 34b form a heat exchanger which shall be called the "second heat exchanger" or "second exchanger" or lower coolant exchanger 34. Coolant may be passed through the second exchanger 34 in heat exchange relation with the lowest part of the interior or absorbing space 13c, that is the part adjacent the bottom or second end of the absorber 13.

The next highest coil unit is the first heat exchanger or "first exchanger" 31 with a rich liquor conduit 31a connected to the outlet of the solution pump 30. The first exchanger 31 has an exterior or inlet manifold 31b and, spiralling inwardly therefrom, a plurality of vertically stacked spiral tubes 31c. The interior ends of the spiral tubes 31c are connected to and communicate with an interior manifold 31d as may be seen in FIG. 2.

Figure 3:
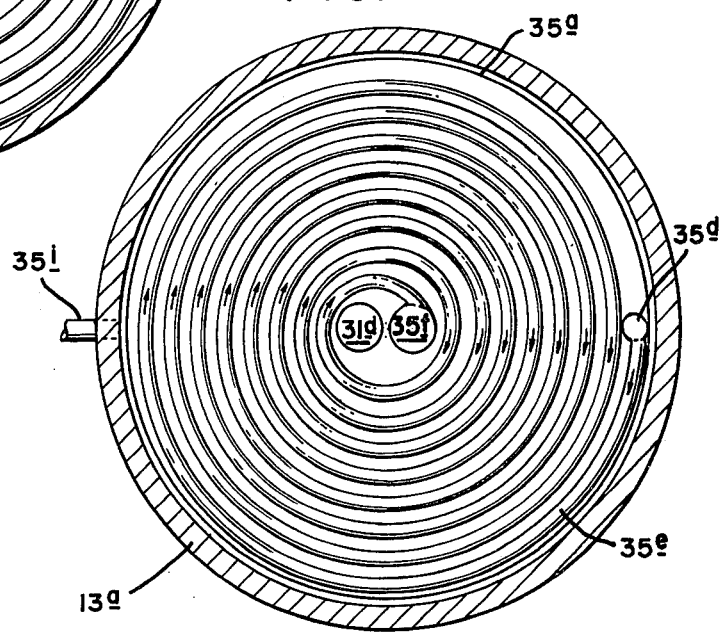
FIG. 3 is a bottom plan view along line 3—3 in FIG. 1.

The next highest coil unit is the lower portion 35a of a third heat exchanger, the "third exchanger" 35. It has an exterior or inlet manifold 35d which communicates through the absorber wall 13a with a coolant conduit or inlet 35c from the condensor coolant outlet. Vertically stacked spiral tubes 35e extend inwardly from the inlet manifold 35d to an interior coolant manifold 35f which extends upwardly from the lower portion 35a of the third exchanger 35 into the upper portion 35b of the third exchanger 35. As can be seen in FIG. 3, the interior rich liquor manifold 31d and interior coolant manifold 35f are adjacent to each other within the central portion of the coil unit 35a, but only the interior coolant manifold 35f communicates with the spiral tubes 35e thereof. The same is true in the next higher coil unit 35b with respect to the spiral tubes 35g, which extend outwardly from the interior coolant manifold 35f to an exterior outlet manifold 35h. The outlet manifold 35h communicates through the absorber wall 13a with a coolant or outlet conduit 32c connected to the space to be heated or to an eight wave valve or, as described in my application Ser. No. 796,773, to a reflux condenser coil (sometimes referred to as reflux coil or refluxer).

The uppermost coil unit 32 or fourth heat exchanger called the "fourth exchanger" has the interior rich liquor manifold 31d extending upwardly into the center thereof. Thus, the interior rich liquor manifold can be seen to be in communication with the "first exchanger", to pass through but be sealed off from the "third exchanger" 35 and to be in communication with the "fourth exchanger" 32. In the fourth exchanger 32, a plurality of vertically stacked spiral tubes 32a spiral outwardly to an exterior or outlet manifold 32b which communicates through the absorber wall 13a with an insulated rich liquor conduit or outlet 32c which is normally connected to the rich liquor inlet of the generator.

In operation, weak liquor flows into the inlet 29 and is distributed by the spreader or distributor 29a as thin films over the coil units. Evaporated refrigerant from the evaporator enters through the inlet 28 and rises upwardly to contact the weak liquor and be absorbed therein. This absorption occurs throughout the interior absorption space 13c and especially in the absorption zones formed by each coil, releasing large amounts of heat due to the high heat of absorption of the absorption pair. A concentration gradient of liquid is established from the weak liquor at the top or first end to the rich liquor at the bottom or second end. A temperature gradient will simultaneously be established with the hottest temperature adjacent the first or top end, due, partly, to the higher saturation temperatures of refrigerant over weak liquor than over strong or richer liquor, and partly to the withdrawal of heat into the coil units or "pathway portions".

For optimal absorption temperatures in systems using an absorbent which has a significant vapor pressure (e.g. ETFE or water), it is important that the evaporated refrigerant flow in counterflow to the absorbent liquid, entering at the rich liquor (warm) end and flowing toward the weak liquor (hot) end. The refrigerant is in the process not only being absorbed into the liquid but also has absorbent evaporating into the vapor phase as the vapor flows toward the weak liquor end, such that the vapor composition at all sections of the absorber approaches the composition in equilibrium with absorbent solution (especially at the weak liquor or hot end). This near-equilibrium condition at all points corresponds to improved thermodynamic efficiency.

The presence of a temperature and concentration gradient throughout the absorber overcomes many of the problems associated with the prior art devices discussed above. For example, refrigerant introduced at its inlet contacts the least hot and richest solution in the absorption zone. Accordingly the evaporation of absorbent into the "dry" vapor (and the accompanying temperature drop) is minimized at that point. Furthermore, the temperature at the hot end adjacent weak liquor inlet 29 is maximized, whereby the temperatures in the first pathway (rich liquor) and in the second pathway (coolant) are maximized.

Furthermore, by dividing the absorption space into narrow vertical vapor passages (the absorption zones), the thickness of the vapor stream is reduced to a minimum, thus reducing the distance that the evaporating absorbent vapor must diffuse through in order to approach saturation of all the vapor. Similarly, the liquid is spread over large surfaces surrounding the vapor on both sides so that the refrigerant vapor can be thoroughly absorbed into the liquid to substantially equilibrium concentrations for the temperature at each point.

A coolant such as water is pumped through the second exchanger from the inlet 34a to the outlet 34i, including passage inwardly through spiral tubes 34e and outwardly through spiral tubes 34g. When split into these small spiral tubes, the coolant is in close heat exchange relation with the absorbing liquid in the absorption zones of the absorption space 13c. The absorbing liquid is particularly on the walls of the spiral tubes where the coolant can extract heat therefrom. From the outlet 34i, coolant travels to the condensor.

Rich liquor from the bottom of the absorption space 13c which is at a higher temperature than the coolant at 34c enters the solution pump 30 and is pumped upwardly to the first exchanger 31 in a higher and warmer portion of the absorber 13. The pump 30 is operated by the rotation of the motor transmitted by the drive shaft 30d and drive magnet 30c, through the absorber wall 13a, to the driven magnet 30b and driven shaft 30a.

Within the first exchanger 31, the rich liquor passes inwardly through spiral coils 31c in close heat exchange relation with absorbing solution in the absorption zones of the space 13c. Absorption heat is thereby used to heat the rich liquor.

Coolant coming from the condensor passes through the third exchanger 35 from its inlet 35c to its outlet 35i. Coolant is heated by the absorbing liquid in a hot portion of the absorption space 13c adjacent the upper or first end of the absorber 13. This heat exchange occurs primarily in the spiral coils 35e and 35g.

Rich liquor from the first exchanger 31 passes upwardly through the inner rich liquor manifold 31d to the fourth exchanger 35, where it is heated by the hottest absorbing fluids in the absorption zones of the absorption space 13c immediately adjacent the first or top end of the absorber 13. The rich liquor is thus heated in exchangers 31 and 32 to a temperature far above its temperature near the solution pump 30 and above that obtainable with systems without a complete temperature and concentration gradient and/or without the large heat exchange surface of exchangers 31 and 32. The rich liquor now passes through the rich liquor outlet 32 to the generator.

Exemplary operation of the absorber 13 in the heating mode (at 0° F. ambient as illustrated in FIG. 11) involves a temperature gradient of about 95° F. at the bottom end adjacent the solution pump 30 to about 165° F. at the top end adjacent the spreader 29a. The coolant pathway takes coolant, such as water, coming from the space to be heated or a heating coil therein (such as a basement or indoor heat exchanger) at about 90° F. and heats it in the second exchanger 34 to about 102° F. Coolant then passes to the condensor, which operates at about 118° F. and which raises the coolant temperature to about 116° F. The third exchanger 35 then heats the coolant to about 125° F. If a reflux coil is used, as described in my application, Ser. No. 796,773, the coolant is then heated to about 126° F. This hot coolant then passes back to the basement heat exchanger where it releases this heat and begins the cycle again. Note that this "coolant pathway" is referred to in my above-referenced copending application as the "first coolant pathway", another pathway being present through the evaporator.

Operation of this system in the heating mode at 0° F. ambient temperature is displayed in FIG. 11. The corners B, C, F and E represent, respectively, the condensation point in the condenser, the evaporation point in the evaporator, the weak liquor at the inlet to the absorber and the peak temperature in the generator. The liquid in the absorber will be along segment FD. The evaporated refrigerant will be at point C (and if passed through a precooler along path U, then near point D). Introduction of refrigerant at the rich liquor end causes equilibrium to be established at or near point D. There, the liquid-vapor equilibrium will be established between about 97% R21 in the vapor phase and about 25% R21 in the liquid phase. By contrast, if "dry" refrigerant is introduced at (or near) point F, then the vapor would have to be under 90% R21 and over 10% ETFE to establish equilibrium. "Dry" refrigerant will cause ETFE evaporation and cooling to an equilibrium point significantly to the left of point F. This results in a lower peak absorber temperature.

In the cooling mode (as for example at 95° F. ambient), the temperature differential in the absorber is from about 110° F. at the bottom to about 190° F. at the top. The rich liquor is heated from about 110° F. to about 120° F. in the first exchanger 31 and then heated to about 140° F. in the fourth exchanger 32. Coolant enters the system from an ambient air heat exchanger at above or equal to ambient air temperature, which will be assumed to be about 95° F. Coolant is heated in the second exchanger 34 to about 112° F., in the condenser to about 124° F. and in the third exchanger 35 to about 135° F. If a reflux coil is used, the coolant is then heated to about 136° F. Hot coolant is conducted (through the eight-way valve) to an ambient air heat exchanger or other heat sink.

It should be appreciated that the above temperatures reflect the typical expected operation of an absorption heat pump system using the absorption pair of R21-ETFE. The condenser and evaporators temperatures, high and low pressures, rich and weak liquor refrigerant concentrations and coolant temperatures at the inlet of the coolant pathway all represent values shown in my copending application Ser. No. 796,773 as typical of the entire system, and are somewhat representative of actual operating conditions.

An absorber according to this first embodiment is optimally suited to use the heat of absorption in optimal fashion to preheat the rich liquor going to the boiler and to heat the coolant for heat input into the space to be heated in the heating mode and for heat rejection to the atmosphere or other heat well or sink in the cooling mode. The arrangement and sizes of the exchangers 31, 32, 34 and 35 are adjusted to permit a gradual temperature differential to be maintained throughout the absorber 13, a desired proportion of the heat of absorption to go to each of the coolant and the rich liquor, and the condenser still to be operated at a selected temperature intermediate the extremes of the temperature differential in the absorber.

The relative sizes (particularly heights) of exchangers 34, 31, 35 and 32 are established by the heat and transfer coefficients of the absorption process, of the cooling fluids and of the rich liquor, as well as the driving force for absorption (pressure differential between actual partial pressures in the vapor and the theoretical, equilibrium partial pressure of refrigerant and absorbent over the actual liquid composition at the actual temperature and pressure) at the various levels of the absorber. The intent is to approach equilibrium closely at the bottom of the absorption space; whereas some temperature, pressure and concentration difference from equilibrium may be permitted near the top of the absorber.

Figure 5:
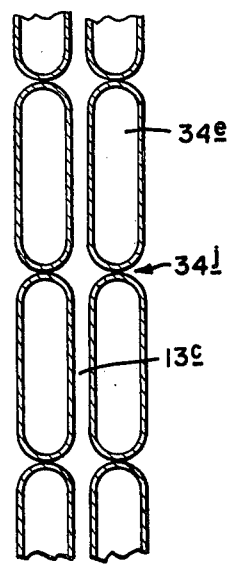
FIG. 5 is an enlarged side elevation view taken along line 5—5 in FIG. 4.

A preferred arrangement and shape of the stacked spiral coils 34e is shown in FIG. 5. This embodiment is particularly well-designed for both thorough absorption and maximum heat exchange. Spiral tubes 34e are oblong in the cross-section, with rounded top and bottom portions. The part of the absorption space 13c between adjacent windings of the spiral coils 34e forms passages or absorption zones for the upward movement of refrigerant vapor. The absorbing liquid flows down the outside of the side walls of the spiral tubes 34e in a thin film, permitting the absorption of refrigerant vapor into the absorbing liquid. The presence of indentations 34j, formed by adjacent rounded top and bottom portions of adjacent spiral coils 34e, causes the absorbing liquid film to both mix and become particularly turbulent and, thus, most prone to absorb refrigerant. Sufficient turbulence may be achieved without each spiral tube forming external indentations (which indentations can take other forms), but instead only certain tubes need have indentations. For example, absorbers with every third, fifth or seventh tube having a rounded bottom portion can be used successfully with R21-ETFE. It should be appreciated that with such a system, an equilibrium is established at numerous points within the absorbing space between refrigerant and absorbing liquid which, in the presence of sufficient refrigerant, causes each such point to have substantially the saturation amount of refrigerant at that temperature in equilibrium with substantially the vapor pressure of refrigerant for that temperature in the vapor phase. During operation, an optimal steady state condition of absorption and heat exchange is found in the absorber 13. It will be appreciated that the same structure as shown in FIG. 5 should be present at one or more points in each of the coil units, including coolant coils and rich liquor coils.

Figure 6:
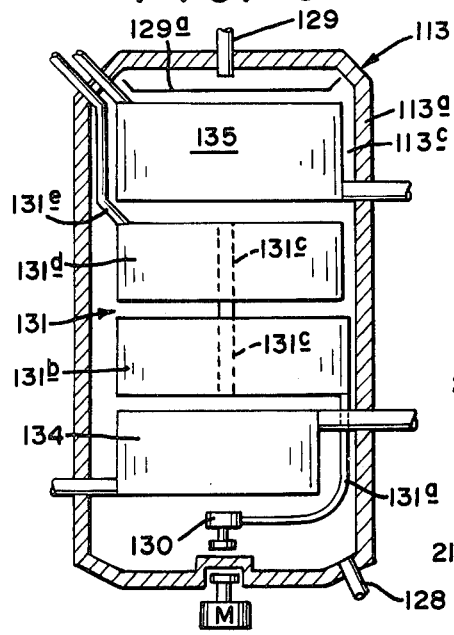
FIG. 6 in a front elevational view of an absorber unit according to a second embodiment of the present invention.

According to a second embodiment of the invention, illustrated in FIG. 6 by absorber 113, a cylindrical absorber wall 113a is provided defining an interior or absorbing space 113c. Within the absorber wall 113a are a first exchanger 131 having a lower coil unit 131b and an upper coil 131d, a second exchanger 134 below the first exchanger 131 and a third exchanger 135 above the first exchanger 131. Weak liquor coming from the generator through the inlet 129 and spread by the distributor 129a mixes in the absorbing space 113c with refrigerant coming from the inlet 128. Coolant from the eight-way valve is pumped through the first exchanger 134 in heat exchange relation with a portion of the absorbing space 113c near the second or bottom end of the absorber 113, and then to the condenser coolant inlet. Coolant from the condenser coolant outlet passes through the third heat exchanger 135 in heat exchange relation with a portion of the absorbing space 113c adjacent the top or first end of the absorber 113, and then to the eight-way valve.

Rich liquor is withdrawn from the bottom of the absorber 113 by the solution pump 130, driven through magnets near recess 113b by a motor, and pumped through conduit 131a to the first exchanger 131. Within the lower coil unit 131a of the first exchanger 131 the rich liquor passes inwardly through spiral coils in heat exchange relation with a portion of the absorbing space 112c to an inner manifold 131c. Rich liquor passes upward through the manifold 131c, outward through spiral tubes in the upper portion 131d of the first exchanger and out a conduit 131e through the absorber wall 113a. An insulated portion of the rich liquor conduit 131e conducts the rich liquor from the absorber 113 to the generator.

During operation and passage of coolant through the absorber 113, the maximum temperatures present in the absorber are imparted to the coolant, with the rich liquor being heated to intermediate temperatures in exchanger 131. This system, as compared to the first embodiment shown as absorber 13, is somewhat less advantageous with absorbant pairs that dictate a higher maximum generator temperature for the rich liquor. With absorption pairs or climactic conditions wherein it is desired to maximize heat transfer to the coolant, and somewhat less rich liquor preheating is desire, the absorber 113 is more suitable. For example, the absorber 113 might be used in cooler climates where extreme heating conditions are encountered, but additional cooling capacity is less important. Absorber 113 may also be used with absorption pairs such as ammonia-water.

According to a third embodiment of the invention, illustrated in FIGS. 7 and 8, an absorber 213 is shown. The weak liquor inlet or conduit 229, spreader 229a, evaporated refrigerant inlet or conduit 228, coolant inlet 232 and solution pump 230 are all similar to corresponding elements of absorbers 13 and 113. The solution pump 230 is connected at its outlet to a distributor 231 for rich liquor which has outlets connected to a series of upwardly extending, annular (or cylindrical) concentric rings 235. The rings 235 are manifolded at their base, with connections to a first plurality of vertically extending, circumferentially spaced, rich liquor passages conduits, tubes or flow spaces 235b defined by adjacent pairs of baffles 235a. Radially alternating with rings 235 are a series of upwardly extending concentric rings 234. Each ring 234 is manifolded at its base in communication with the coolant inlet 232 so as to connect coolant passages, conduits, tubes or flow spaces 234b between baffles 234a into the coolant circuit. As illustrated in FIG. 8, each ring 234 has coolant passages, 234b, and each ring 235 has rich liquor passages 235b. All of the rich liquor tubes 235b are manifolded at the top of the rings 235 and connected to a rich liquor outlet or conduit 235c leading to the generator. All of the coolant tubes 234b are manifolded at their top and connected to a coolant outlet 234c. Absorption occurs in the annular spaces or absorption zones 236 between adjacent rings 234 and 235 which together form a major portion of the interior or absorbing space 213c. Absorbing liquid flows down the facing walls of adjacent rings 234 and 235 and absorbs refrigerant rising in the middle of each annular space 236. Coolant in tubes 234b and rich liquor in tubes 235b withdraws the heat of absorption before passing out outlets 234c and 235c, respectively.

As shown in FIG. 7, both rings 234 and rings 235 extend from adjacent pump 230 upwards. Cooler minimum absorber temperatures (and hence richer rich liquor) may be desirable for some absorption pairs. A coolant coil similar to exchanger 34 or 134 may be inserted above pump 230 and connected between inlet 232 and tubes 234b. Rings 234 and 235 would then begin above the extra cooling coil.

Absorber 213 is somewhat less preferred than absorbers 13 and 113 for absorption pairs such as R21-ETFE, if the surfaces are smooth. If sufficient surface indentations are provided to cause sufficient mixing and turbulence, these designs would be satisfactory. Otherwise, the annular spaces 236, forming a pure falling film zone, may provide insufficient turbulence and excessive speed for good absorption of refrigerant in absorbing liquid and good heat exchange of absorbing liquid with rich liquor and coolant. Additionally, the condenser must be connected either by its coolant outlet to the absorber coolant inlet 232 or by its coolant inlet to the absorber coolant outlet 235c. For many absorption pairs, one or the other of these connections is preferred; but for R21-ETFE, it is preferred that the condenser operate at a temperature intermediate the extremes in the absorber and the desired temperature range in the coolant pathway. Many of the above drawbacks do not apply to systems for absorbtion pairs such as ammonia-water.

An additional configuration of the absorber is illustrated in FIGS. 9 and 10.

In FIGS. 9 and 10, an absorber 313 is shown with absorber wall 313a having a weak liquor inlet 329 at the top end, a refrigerant vapor inlet 328 near the bottom end and a rich liquor outlet 330a at the bottom end. A solution pump 330 is outside (but could be inside) the absorber 313 and connected by its inlet to the outlet 330a and at its outlet to a conduit 331 back into absorber. A coolant conduit 334 passes into the absorber adjacent the bottom end where it forms three equally spaced coils 334a, 334b and 334c, from the outside to inside, each extending helically up the interior of the absorber 313. The conduit 331 terminates in a coil 331a above and between adjacent windings of coils 334a and 334b and a coil 331b above and between adjacent windings of coils 334b and 334c. Coils 331a and 331b begin several windings above the bottoms of coils 334a, 334b and 334c. The coils 334a, 334b, 334c, 331a and 331b together divide the absorption zone into a plurality of tortuous paths because of the overlapping coils, as can be seen in FIG. 10.

Of course many modifications of each of these embodiments may be made without departing from the scope of the present invention. For example, a helix or multiple helix of rich liquor coils (and coolant coils) may form each of the rings 235 (and 234) in absorber 213. The conduit 331 may be totally within absorber 313. The structure associated with solution pumps 30, 130 and 230 may be varied either by providing for a suitable long shaft from the motor to the pump through the absorber wall (provided with a proper seal) or by providing a conduit for conducting rich liquor outside the absorber wall to a pump and then back through the absorber wall to the first exchanger or by providing a hermetically sealed motor within the pump casing. In absorber 213, the relative amounts of heat transferred to coolant and rich liquor may be varied by alterations in the distributor 231 and various manifolds to convert some rich liquor passages 235b to coolant passages 234b, or vice versa, as dictated by the desired operating conditions and the thermodynamic properties of particular absorption pairs.

Other deletions, additions and modifications may also be made in the above-described embodiments without departing from the spirit and scope of the invention as set forth in the claims that follow.

I claim:

1. An absorber unit for an absorption heat pump system comprising:
    a housing defining an interior absorption space and having a first end, a second end, a first inlet adjacent the first end, a second inlet adjacent the second end and an outlet adjacent the second end, and
    a plurality of heat exchange elements located within said housing forming a plurality of pathway portions located in heat exchange relation with said interior absorption space and with said absorber housing for withdrawing heat from said interior absorption space when absorption occurs in said interior absorption space;
    with some of said plurality of pathway portions being joinable into a first pathway for conducting a coolant and the remainder of said plurality of pathway portions being joinable into a second pathway for conducting rich liquor;
    said second pathway communicating with said outlet and said plurality of pathway portions dividing said interior absorption space into a plurality of absorption zones, with each pathway portion being sealed off from and in heat exchange relation with an adjacent absorption zone for thorough mixing and absorption in said absorption zones and a high level of heat exchange into said pathway portions.

2. The absorber unit of claim 1 further comprising a solution pump in said interior absorption space adjacent said second end having an inlet communicating with said interior mixing space and an outlet communicating with said second pathway, said solution pump inlet being the outlet of said absorber unit.

3. The absorber unit of claim 1 further comprising a prime mover outside said housing, a drive magnet outside said housing adjacent said second end operatively connected to said prime mover to be rotated thereby, a driven magnet inside said absorber in proximity to said drive magnet and a driven shaft operatively connecting said driven magnet to said solution pump.

4. The absorber unit of claim 1 wherein said heat exchange elements comprise a plurality of coil units each having a plurality of spiral coils stacked in a parallel arrangement and manifolded on the outside and inside thereof, with each of said pathway portions being the branched interconnection between an outside manifold and an inside manifold.

5. The absorber unit of claim 4 wherein said spiral coils each have flat side faces and rounded top and bottom faces, with adjacent spiral coils being stacked top to bottom, and each spiral coil having a plurality of turns each having a side face spaced from the facing side face of the adjacent turn.

6. The absorber unit of claim 1 wherein said plurality of heat exchange elements includes a first heat exchange element which is connected in said first pathway, a second heat exchange element which is connected in said second pathway and is located between said first heat exchange element and said first end.

7. The absorber unit of claim 6 wherein said second heat exchange element has an inlet through said absorber wall for connection to a coolant source and an outlet through said absorber wall for connection to the coolant inlet of the condenser of the heat pump system and said plurality of heat exchange elements further comprises a third heat exchange element located between said first heat exchange element and said first end, said third heat exchange element having an inlet through said absorber wall for connection to the coolant outlet of the condenser and an outlet through said absorber wall.

8. The absorber unit of claim 7 wherein said first heat exchange element has an inlet connected to said outlet of said absorber and an outlet through said absorber wall for connection to the rich liquor inlet of the generator of the heat pump system.

9. The absorber unit of claim 7 wherein said plurality of heat exchange elements further comprises a fourth heat exchange element which is connected in said first pathway and is located between the third heat exchange element and the first end and has an outlet through said absorber wall for connection to the rich liquor inlet of the generator of the heat pump system and also has an inlet, and wherein said first heat exchange element has an outlet connected to the inlet of said fourth heat exchange element.

10. The absorber unit of claim 1 wherein said plurality of heat exchange elements includes a plurality of concentric rings extending parallel to a central axis of said absorber housing and extending from a first end adjacent the first end of the absorber housing to a second end adjacent the second end of the absorber housing, each ring being radially spaced from the adjacent ring.

11. The absorber unit of claim 10 wherein each of said plurality of rings includes a concentric inner and outer wall and a plurality of circumferentially spaced baffles extending therebetween and from adjacent the first end of each ring to adjacent the second end of each ring and dividing each ring into a plurality of passages extending from adjacent the first end of each ring to adjacent the second end of each ring; a first plurality of said passages of said rings being connected in said first pathway with portions adjacent their second ends being connected to the outlet of said absorber and with portions adjacent their first ends being connected to a first pathway outlet through said absorber wall for connection to the rich liquor inlet of the heat pump system.

12. The absorber unit of claim 11 wherein a second plurality of said passages are connected in said second pathway with portions adjacent their second ends being connected to a first pathway inlet through said absorber wall and with portions adjacent their first ends being connected to a second pathway outlet through said absorber wall.

13. The absorber unit of claim 11 further comprising a solution pump within said housing having an inlet communicating with the interior absorbing space adjacent the second end of said housing and being the absorber outlet, said solution pump also having an outlet connected to the first plurality of passages adjacent their second ends.

14. An absorber unit for an absorption heat exchange system comprising a housing having two ends and defining an interior space and defining a weak liquor inlet at one end and a refrigerant inlet at the other end, means for establishing within the interior space a temperature and concentration gradient of weak liquor absorbing refrigerant from a lowest refrigerant content and highest temperature adjacent said one end to a highest refrigerant content and lowest temperature adjacent said other end, means for withdrawing solution at the highest refrigerant content and lowest temperature from adjacent said other end and passing the solution in heat exchange relation with a hotter portion of the interior space and means for withdrawing heat from said absorption space into a coolant circuit.

15. The absorber unit of claim 14 wherein said means for establishing includes a plurality of pathway portions dividing said interior space into a plurality of absorption zones, said means for withdrawing and passing solution includes at least one of said pathway portions and said means for withdrawing heat includes at least one other of said pathway portions, with each pathway portion being sealed off from and in heat exchange relation with an adjacent absorption zone for thorough mixing and absorption in said absorption zones and a high level of heat exchange into said pathway portions.

16. In a method of absorption heat exchange including the steps of generating a refrigerant vapor from an absorbent solution rich in refrigerant, condensing the refrigerant vapor, evaporating the condensed refrigerant vapor and absorbing the evaporated refrigerant vapor into an absorbent solution weak in refrigerant to form the absorbent solution rich in refrigerant, the improvement in which the absorbing step comprises:
forming a falling film of absorbent solution within a vessel on heat exchange surfaces from a first, top end of the vessel to a second bottom end of the vessel;
releasing a refrigerant vapor to an inlet adjacent the second, bottom end of the vessel into a zone adjacent the falling film;
absorbing the refrigerant vapor in the zone into the absorbent solution; and withdrawing heat from the falling film through the heat exchange surfaces, whereby a temperature and concentration gradient is established from adjacent the first, top end to the second, bottom end.

17. The method of claim 16 wherein the absorbent solution weak in refrigerant is divided into a first plurality of portions forming a first plurality of falling film portions and the evaporated refrigerant is divided into a second plurality of vapor portions each of which is released adjacent one of said first plurality of falling film portions.

18. The method of claim 17 wherein two of said first plurality of falling film portions are on facing heat exchange surfaces and one of said second plurality of vapor portions occupies the space between the two facing falling film portions.

19. The method of claim 17 wherein said heat exchange surfaces form a third plurality of concavities and the falling film portions are rendered turbulent at the concavities.

20. The method of claim 16 further comprising withdrawing absorbent solution rich in refrigerant from adjacent the second, lower end and conveying the absorbent solution rich in refrigerant through a rich liquor conduit whose interior is in heat exchange relation with the falling film, but out of communication with the falling film, whereby the absorbent solution rich in refrigerant is heated through the heat exchange surfaces, but is maintained at the high refrigerant content of absorbent solution adjacent said second, lower end.

21. The method of claim 20 wherein a coolant is passed in heat exchange relation with the heat exchange surface to withdraw heat therethrough from the falling film of absorbent solution.

22. The method of claim 21 wherein the absorbent solution rich in refrigerant is pumped upwards through a plurality of rich liquor passages and a coolant is pumped upwards through a plurality of coolant passages.

23. The method of claim 22 wherein the heat transfer surfaces form concentric, annular, cylindrical rings each with an inside surface and an outside surface; the absorbent solution forms a falling film inside of and on the inside surface and a falling film surface outside of and on the outside surface; and the rich liquor and coolant passages are circumferentially arranged between the inside surface and the outside surface.

24. The method of claim 23 wherein a portion of the refrigerant vapor is released into a thin vapor space between the falling film on an inside surface and the falling film on the facing outside surface.

25. The method of claim 21 wherein the absorbent solution rich in refrigerant passes upward through one set of heat exchange coils and the coolant passes upward through a second set of heat exchange coils.

26. The method of claim 25 wherein the first and second sets of coils are concentric helixes in packed array and the falling film passes over the outside surface of one coil and then over the surface of a lower coil.

27. The method of claim 25 wherein the one set of heat exchange coils includes a plurality of vertically spaced spiral tubes with falling film and refrigerant vapor between adjacent windings of each spiral tube and the refrigerant is pumped inwardly through one spiral tube, upwardly to a higher spiral tube and outwardly through the higher spiral tube.

28. The method of claim 27 wherein the second set of heat exchange coils includes a plurality of vertically spaced spiral tubes with falling film and refrigerant vapor between adjacent windings of each spiral tube and the coolant is pumped inwardly through one spiral tube, upwardly to a higher spiral tube and outwardly through the higher spiral tube.

29. The method of claim 28 wherein one spiral tube has a rounded bottom surface and the next lower spiral tube has a rounded top surface, whereby the falling film is made turbulent adjacent the interface between the rounded bottom outside surface of the one spiral tube and the rounded top outside surface of the next lower spiral tube.

* * * * *